United States Patent
Avery et al.

(10) Patent No.: US 6,746,495 B2
(45) Date of Patent: Jun. 8, 2004

(54) METHOD FOR CONTROLLING DEPOSIT FORMATION IN GASOLINE DIRECT INJECTION ENGINE BY USE OF A FUEL HAVING PARTICULAR COMPOSITIONAL CHARACTERISTICS

(75) Inventors: Noyes L. Avery, Bryn Mawr, PA (US); Paul Patrick Wells, Mullica Hill, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 82 days.

(21) Appl. No.: 09/967,265

(22) Filed: Aug. 28, 2001

(65) Prior Publication Data

US 2002/0120171 A1 Aug. 29, 2002

Related U.S. Application Data

(60) Provisional application No. 60/242,814, filed on Oct. 24, 2000.

(51) Int. Cl.[7] ............................................. C10L 1/104
(52) U.S. Cl. ............................ 44/640; 208/14; 208/15; 208/16; 585/14
(58) Field of Search ........................ 208/16, 17; 585/14

(56) References Cited

U.S. PATENT DOCUMENTS

| | | | | |
|---|---|---|---|---|
| 3,755,140 A | * | 8/1973 | Pollitzer | 501/110 |
| 3,807,974 A | * | 4/1974 | Kerley et al. | 44/382 |
| 3,877,889 A | | 4/1975 | Dix | 44/73 |
| 3,948,619 A | | 4/1976 | Worrel | 44/58 |
| 4,022,589 A | | 5/1977 | Alquist et al. | 44/58 |
| 4,594,144 A | * | 6/1986 | James et al. | 208/62 |
| 5,518,511 A | * | 5/1996 | Russell et al. | 44/347 |
| 6,187,171 B1 | * | 2/2001 | Tsuboi | 208/16 |

FOREIGN PATENT DOCUMENTS

| | | | |
|---|---|---|---|
| EP | 0647700 | 4/1995 | C10L/1/14 |
| EP | 0831141 | 3/1998 | C10L/1/22 |
| GB | 1368532 | 9/1974 | C10L/1/22 |
| WO | 87/01384 | 3/1987 | C10L/1/18 |

* cited by examiner

*Primary Examiner*—Margaret B. Medley
(74) *Attorney, Agent, or Firm*—Paul E. Purwin

(57) ABSTRACT

The formation of deposits on the injectors of gasoline direct injection engines controlled by combustion in said engine of a fuel comprising a gasoline containing about 12 to 65 vol % aromatics when the aromatics present in the fuel are attributable to the presence in the fuel of light fluid cat cracker stream product, reformate or a mixture thereof, preferably predominantly reformate.

9 Claims, 2 Drawing Sheets

METHOD FOR CONTROLLING DEPOSIT FORMATION IN GASOLINE DIRECT INJECTION ENGINE BY USE OF A FUEL HAVING PARTICULAR COMPOSITIONAL CHARACTERISTICS

This application claims the benefit of U.S. Provisional Application No. 60/242,814 filed Oct. 24, 2000.

BACKGROUND OF THE INVENTION

1. Field of the Invention

The present invention relates to a method for operating a spark ignition, direct injection gasoline engine to control the formation of deposits on the fuel injectors by combustion in said engine of a fuel characterized as a gasoline of particular composition.

2. Description of the Related Art

Gasoline direct injection (GDI) engine technology has been investigated for about 80 years, but injector coking is still a major concern. Because gasoline direct injection engines have a fuel economy benefit of 15–30% and result in the production of lower levels of greenhouse gas $CO_2$ emissions and exhibit a power improvement of 5–15% per unit volume of engine displacement, they have continued to be investigated and developed despite the technical challenges of fuel management control, engine deposits, exhaust emissions control and injector fouling. An especially attractive feature of gasoline direct injection engines is the reduction in the octane requirement of the engine. Because of in-cylinder fuel evaporation and resulting charge cooling effect, up to a six number lower octane requirement can be exhibited by a GDI. However, as previously stated, and despite the advantages demonstrated by GDI engines, early GDI engines such as the Texaco TCP of 1951 and the Ford PROCOS of 1968 suffered from severe deposit problems which contributed to the demise of those programs.

Gasoline direct injector engines, however, have continued to be developed in Japan and Europe. Mitsubishi, Toyota, Nissan, Honda, Mazda, Renault and VW have all indicated a commitment to pursuing GDI engine technology and commercializing vehicles powered by GDI engines.

However, injector fouling will continue to be an area of concern for manufacture and vehicle owner.

DESCRIPTION OF THE INVENTION

Figure 1:
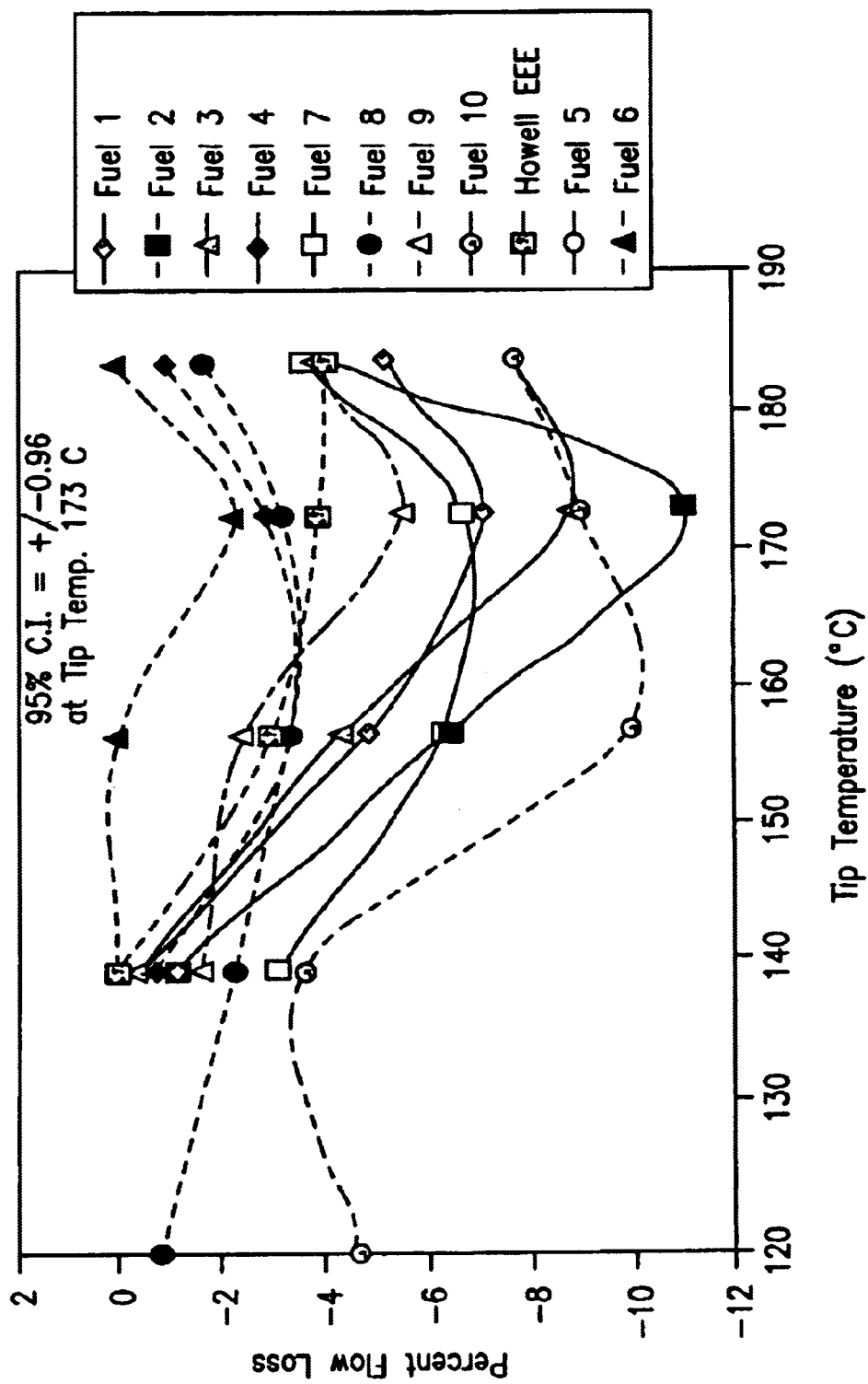
FIG. 1 reports the percent flow loss versus tip temperature for the eleven fuels evaluated.

Pump gasoline can contain anywhere from about 12 to about 65 vol % aromatics, typically about 20–40 vol %, more typically about 25 to 35 vol % aromatics. (See "How Gasoline Has Changed", L. M. Gibbs, SAE Technical Paper Series #932828, October 1993.) The present invention is directed to the discovery that the nature of the aromatics is important in controlling the formation of injector deposits in gasoline direct injection (GDI) engines.

It has been discovered that injector deposit formation in a GDI engine is controlled by combusting in the engine a fuel comprising gasoline containing from about 12 to about 65 vol % aromatics wherein the source of the aromatics is a stream selected from the group consisting of reformate, fluid catalytic cracker stream and mixtures thereof, and wherein with respect to the fluid catalytic cracker stream, light fluid cat cracker stream constitutes about 70% to 100% of the fluid cat cracker stream, preferably about 85% to 100%, most preferably about 95% to 100% of the total FCC stream. It is preferred that the aromatics source is reformate.

Preferably it has been discovered that in the operation of a GDI engine wherein injector deposit formation is controlled by combustion in the engine of a fuel comprising gasoline characterized by having a $T_{90}$ in the range of about 150–182° C., preferably about 160–182° C., an olefins content in the range of about 3.6–20 vol %, preferably about 3.6 to 10 vol %, more preferably less than 5 vol %, a sulfur content in the range of about 50–400 ppm, preferably about 150 ppm, an aromatics content in the range of about 10–45 vol %, preferably about 25 to 37 vol % injector deposit formation control is improved when the aromatics are secured from reformate, a fluid cat cracker (FCC) stream or mixture thereof, and wherein with respect to the fluid cat cracker stream, light FCC stream constitutes about 70% to 100%, preferably about 85% to 100%, most preferably about 95% to 100% of the total FCC stream, it being preferred that the automatics source is reformate.

Preferably the fuel is unleaded gasoline and may contain quantities of other, typical gasoline additives such as detergents, including Mannich bases, polyisobutyl amines, polyether amines or succinimides, preferably Mannich bases, in an amount in the range 25 ptb to 200 ptb, antioxidants such as phenolic or aminic antioxidants, lubricity additives such as fatty acids or fatty acid esters, oxygenates such as alcohol or ethers, e.g., methyltertbutyl, ether, anti icing additives, demulsifiers, corrosion inhibitors, dyes, etc.

It has been discovered that the control and reduction in the formation of deposits on the injectors of spark ignition gasoline direct injection engines operating on the fuels characterized by the above recited $T_{90}$, sulfur content olefins content and aromatics content is further and unexpectedly improved when the source of aromatics in the fuel is selected from the group consisting of reformate, light fluid cat cracker streams or mixtures thereof, preferably reformate.

Catalytic cracking, or cat cracking as it is commonly referred to, is an established and widely used process in the petroleum refining industry for converting petroleum oils of relatively high boiling point to more valuable lower boiling products, including gasoline and middle distillates, such as kerosene, jet fuel and heating oil. The preeminent catalytic cracking process now in use is the fluid catalytic cracking process (FCC) in which a preheated feed is brought into contact with a hot cracking catalyst which is in the form of a fine powder, typically having a particle size range of from about 10–300 microns and with a mean particle size of about 70–100 microns, for the desired cracking reaction to take place. The catalyst is fluidized by the hydrocarbon vapors. Catalysts which are conventionally used are based on zeolites, especially the large pore synthetic faujasites, zeolites X and Y. During the cracking, coke and hydrocarbonaceous material are deposited on the catalyst particles. This results in a loss of catalyst activity and selectivity. The coked catalyst particles and associated hydrocarbon material are subjected to a stripping process, usually with steam, to remove as much of the hydrocarbonaceous material as is technically and economically feasible. The striped catalyst particles, containing non-strippable coke, are removed from the stripper and sent to a regenerator where they are regenerated by contact with an oxygen-containing gas, typically air or a mixture of air and oxygen, at an elevated temperature. This results in the combustion of the coke which is a strongly exothermic reaction which, besides removing the coke, serves to heat the catalyst to the temperatures appropriate for the endothermic cracking reaction. The process is carried out in an integrated unit which comprises cracking, stripping and regenerating zones and associated ancillary equipment. Typically the cracking and stripping zones are associated with a single vessel or unit, with the regenerator being a separate unit. The catalyst is continuously circulated from the reactor or reaction zone, to the stripper and then to the regenerator and back to the reactor. The catalyst circulation rate is typically adjusted relative to the feed rate of the oil to maintain a heat balanced operation in which the heat produced in the regenerator is sufficient for maintaining the cracking reaction, with the circulating regenerated catalyst being used as the heat transfer medium.

As used in the present specification and the appended claims, by light fluid cat cracking stream fraction is meant a fraction characterized as having an initial boiling point (IBP) in the range of about 90° F. to 100° F., a $T_{10}$ in the range of about 130° F. to 150° F., a $T_{90}$ in the range of about 280° F. to 300° F., and a final boiling point in the range of about 330° F. to 350° F., preferably an IBP in the range of about 90–95° F., a $T_{10}$ in the range of about 130–140° F., a $T_{90}$ in the range of about 280–290° F., and a FBP in the range of about 330–340° F., most preferably an IBP of about 90° F., a $T_{10}$ of about 130° F., a $T_{90}$ of about 280° F., and a FBP of about 330° F.

Reforming is the process whereby the higher boiling, but lower value, lower octane portion of gasoline, e.g., virgin naphtha be it straight run or produced by hydrocracking is converted into higher octane gasoline by the rearrangement of the molecular structure of the hydrocarbon. The primary physical change which occurs are dehydrogenation of cyclic compound (cycloparaffins) into aromatics, e.g., cyclohexane and naphthenes into benzene, toluene, xylene, etc., while straight chain paraffins of sufficient carbon number ($C_6$ and greater can undergo dehydrocyclization for conversion similarly into benzene, toluene, ethyl benzene, xylene, etc.

Reforming can occur either thermally (thermal reforming) or via catalysis (catalytic reforming). In either case the end product obtained is an aromatics enriched stream suitable for addition to the mogas pool. Preferably the reforming is catalytic reforming as the end product obtained is much higher in octane than can be secured by thermal reforming.

Reformate suitable for use in the present invention is characterized by a RON of about 95 to 105, preferably about 98 to 102, an initial boiling point in the range of about 90 to 95° F., a $T_{10}$ in the range of about 140 to 145° F., a $T_{90}$ in the range of about 310–320° F., a final boiling point (FBP) in the range of about 400 to 430° F. and an aromatics content of about 40–70%, preferably an IBP of about 95° F., a $T_{10}$ of about 145° F., a $T_{90}$ of about 310° F., an FBP of about 400° F., and an aromatics content of about 50% to 65%.

The amount of reformate, fluid cat cracker stream stock or mixture thereof, preferable reformate, included in the gasoline is an amount sufficient to produce in the final gasoline product an aromatics content within the aforesaid range of about 10 to 45 vol %, preferably about 20 to 40 vol %, more preferably about 25 to 37 vol %.

If a mixture of reformate and fluid cat cracking stream stock is employed the ratio of reformate to fluid cat cracker stream product is in the range of about 100:0 to 25:75, preferably 100:0 to 75:25, most preferably about 100:0 to 80:20. It is preferred, however, that the aromatics in the gasoline be attributable predominately to reformats, i.e., about 70% to 100% of the aromatics come from reformate, preferably about 80% to 100% of the aromatics come from reformate.

EXPERIMENTAL

An eleven-fuel test matrix was designed around $T_{90}$, sulfur level, and olefins level indicated in European Gasoline specifications for year 2000. Three additional fuels were blended to study the effects of fuel aromatics content. The fuels are base fuels and contained no detergents or other additives other than antioxidant. They were formulated using refinery stream blends to meet the specific compositional targets and to insure that such fuels could be produced commercially.

The engine test bed was a conventional dual sparkplug 2.2 liter Nissan engine modified for direct injection using one of the sparkplug holes. Injector tip temperatures were controlled to range from 120 to 184° C. to match the injector tip temperatures typically encountered in the two main types of GDI designs: spray-guided and wall-guided combustion systems.

Spray-guided systems involve a controlling mounted injector located close to the spark plug. The distance of separation is such that the spark ignites the edge of the spray cone. Because of the close proximity of the injector tip to the combustion event, this type of system is prone to injector coking due to high tip temperatures.

Wall-guided systems have injectors mounted at an angle, and the spray is deflected off the top of the piston towards he spark plug. Because the injector tip allows lower tip temperature as a consequence of being a greater distance from the flame front and due to the greater air movement around the tip reducing the amount of residual fuel at the tip available for combustion, this type of system experiences less injector coking.

The 2.2 liter engine was modified to run in a homogeneous direct injection mode. Modifications included replacing the exhaust side spark plug with pre-production high-pressure common-rail direct injectors, removing the original equipment manufacturer's spark and fuel system and installing a high pressure fuel system and universal engine controller. For homogeneous combustion, flat top pistons and the conventional gasoline spark ignition combustion chamber design were found to be sufficient. The injectors were located on the hot (exhaust) side of the engine to favor high tip temperature to favor injector deposit formation.

The test engine specifications are presented in detail in Table 1.

TABLE 1

| Type | Four Cylinder In-Line 2.2 L Nissan Engine Converted for DI Operation |
|---|---|
| Displacement | 2187 cubic centimeters |
| Plugs/Cylinder | 1 (stock configuration: 2) |
| Valves/Cylinder | 2 |
| Bore | 87 millimeters |
| Stroke | 92 millimeters |
| Fuel System | Common Rail High Pressure Direct Injection |
| Fuel Pressure | 6900 kPa (closed loop) |
| Engine Controller | Universal Laboratory System |
| Injection Timing | 300 degrees BTDC |
| Ignition Timing | 20 degrees BTDC |
| Coolant Temperature | 85° C. |
| Oil Temperature | 95° C. |

It was found that the key operating parameters of the engine were inlet air and fuel temperature, engine speed and engine load.

The inlet air and fuel temperatures were controlled at 35° C. and 32° C. respectively.

At constant inlet air and fuel temperature and engine load, tip temperature remained constant at engine speeds of 1500, 2000, 2500 and 3000 rpm.

However, at constant engine speed and constant inlet air and fuel temperatures, tip temperature increased with load. For five load points of 200, 300, 400, 500 and 600 mg/stroke air charge, increasing tip temperature of 120, 140, 157, 173 and 184° C., respectively, were observed.

Based on this information test conditions were set at a constant engine speed of 2500 rpm, inlet air temperature of 35° C., inlet fuel temperature of 32° C. with tip temperature being controlled by controlling the load. In the case of each first tested, at least four load points were run for each fuel.

The test is divided into three periods: engine warm-up, an operator assisted period, and a test period.

Engine speed was controlled using the engine dynamometer controller, and the engine throttle was manipulated to control air charge using a standard automotive airflow meter as feedback in a closed-loop control system. Engine fueling was controlled in two ways. During warm-up, injector pulse width was controlled using a standard mass airflow strategy and exhaust gas sensor controlling the air/fuel mixture to stoichiometric. During the operator interaction period, the pulse width was manually set for each injector using wide-range lambda sensors in the exhaust port of each cylinder. Fuel flow was measured using a volumetric flow meter and a temperature-corrected density value was used to calculate mass flow. Ignition timing was held constant at 20° BTDC throughout the test. Inlet air temperature was controlled to 35+/−2° C. and fuel temperature at the inlet to the high-pressure pump was controlled to 32 +/−2° C. Data were sampled ten times per second and averaged to form a record of all recorded parameters every ten seconds during the test.

Data acquisition began as soon as the engine was started. The engine idled for one minute before the speed was raised to 1500 rpm and the air charged (load) to 300 mg per stroke to warm the engine to operating temperature. During this 30-minute warm-up period coolant and oil temperatures were linearly raised from 40 to 85+/−2° C. and 40 to 95+/12° C., respectively.

At the end of warm-up, engine speed was increased to 2500 rpm, and the air charge adjusted to the test load target, which ranged from 100 to 600 mg air/stroke depending on the desired injector tip temperature. Within five minutes injector pulse width for each cylinder was manually adjusted to a lambda target value of 0.800+/−0.005.

For the remainder of the test, pulse width, speed, and air charge remained constant. The change in fuel flow for the engine and the calculated change in fuel flow, based on lambda of each individual cylinder, were the measure of the injector flow decrease due to deposit formation.

Each fuel was run at four to five load conditions as previously stated. The points were repeated for each fuel using the average injector flow loss for the engine as a function of injector temperature to form a characteristic curve for each fuel. Injector deposit formation was followed by measuring total engine fuel flow at fixed speed, air charge (mass of air per intake stroke), and the lambda signal from each cylinder over a test period of six hours.

To help minimize injector-to-injector variability the same set of injectors was used for all tests at a particular engine load, with each injector always in the same cylinder. Different sets of injectors, however, were used for different load conditions.

After each test, injector tips were photographed and external deposits scraped off and collected together as one for each fuel. Analyses by scanning electron microscope (SEM), and infrared spectroscopy (IR) were then conducted. The internal deposits were flushed out in a special rig with 200 ml pentane and a mixture of MTBE/pentane/methanol in a ratio of 1/0.5/0.5 with the injector powered. The solvent mixture was evaporated, and the residue analyzed by SEM and IR. For comparison, each fuel was similarly concentrated and the residue analyzed as above. A sample of unused lubricant was similarly analyzed. This was done to define relative contributions of fuel and lubricant to the deposit.

An injector-cleaning rig was equipped with a high-pressure fuel rail and a pump that cycled cleaning fluid through the injectors. Injectors were pulsed to allow the cleaning fluid through. This cleaning process brought the injectors to their baseline flow conditions as confirmed by the repeatability of numerous reference fuel testing during the study.

FUELS

The fuels matrix was designed to examine fuel composition effects on deposit formation, with maximum values of $T_{90}$, sulfur, and olefins based on European fuel specifications in the year 2000 (olefins: 18 vol % maximum; sulfur: 150 ppm maximum; $E_{100}$: 46% minimum; $E_{150}$: 75% minimum). The test fuels were blended from refinery streams to match the desired test matrix design in Table 2. Howell EEE gasoline was included as the eleventh fuel. None of the fuels were additized.

TABLE 2

Specifications gasoline matrix, test fuels

| Fuel Number | $T_{90}$ (° C.) | Olefins (vol %) | Sulfur (ppm) | Aromatics (vol %) |
|---|---|---|---|---|
| 1 | 160 | 5 | 30 | 16 |
| 2 | 182 | 5 | 30 | 16.4 |
| 3 | 160 | 20 | 30 | 18.0 |
| 4 | 182 | 20 | 30 | 22.8 |
| 5 | 160 | 5 | 150 | 20.6 |
| 6 | 182 | 5 | 150 | 31.9 |
| 7 | 160 | 20 | 150 | 10.4 |
| 8 | 182 | 20 | 150 | 20.8 |
| 9 | 171 | 12.5 | 90 | 19.9 |
| 10 | 171 | 12.5 | 400 | 29.8 |
| Howell EEE | 160 | 1.2 | 20 | 26.6 |

TEMPERATURE EFFECT ON FLOW LOSS

For most fuels tested flow loss becomes increasingly severe with increasing tip temperature (load) up to a maximum tip temperature of 173° C. (load 500 mg/stroke air), but surprisingly improves slightly at even higher tip temperature of 184° C. (load 600 mg/stroke air) (FIG. 1). The observed reduction of deposits at the highest injector tip temperature may be related to the reported temperature effects on combustion chamber deposits (CCD), where an inverse relationship between wall temperature and CCD was determined.

FUEL COMPONENT EFFECT

FIG. 1 shows the injector plugging characteristics of all fuels tested at various tip temperatures. There is a large difference between these fuels with the most significant occurring at tip temperature of 173° C. Four replicate tests of Fuel 7 at 173° C. tip temperature (flow loss of −5.4, −5.06, −5.2, and −6.67%) indicated the test-to-test standard deviation of +/−0.8% fuel flow loss or a coefficient of variation (COV) of 14%.

As is seen, increasing values of $T_{90}$ were found to be beneficial with respect to injector plugging, while higher olefin levels resulted in somewhat greater plugging tendencies. Sulfur was found to have a non-linear effect, producing a beneficial effect up to 150 ppm, and then reversing its effect up to 400 ppm.

To investigate the effect of aromatics, if any, on deposit formation a three fuel matrix was evaluated. This set of test matrix fuels is described in Table 3 below.

TABLE 3

|  | Aro-1 | Aro-2 | Aro-3 |
|---|---|---|---|
| Component, vol. fct. |  |  |  |
| Alkylate | 70.0 | 30.0 | — |
| FCC - Heavy | 3.0 | — | 11.0 |
| FCC - Light | — | — | 21.0 |
| FCC - Light | 12.0 | 15.0 | 53.0 |
| Reformate-98 RON | 15.0 | 55.0 | 15.0 |
| Total, vol. fct. | 100.0 | 100.0 | 100.0 |
| Distillation (D86), F |  |  |  |
| IBP | 92 | 92 | 100 |
| 10 vol% | 152 | 145 | 143 |
| 50 vol% | 223 | 229 | 213 |
| 90 vol% | 314 | 316 | 317 |
| EP | 413 | 406 | 415 |
| RVP (D5191), psi | 6.8 | 7.0 | 6.3 |
| RON | 93.5 | 95.6 | 90.7 |
| MON | 89.4 | 88.2 | 81.7 |
| (R + M)/2 | 91.5 | 91.9 | 86.2 |
| PIONA (M1530-14), vol% |  |  |  |
| Saturates | 81.4 | 58.7 | 50.7 |
| Olefins | 3.6 | 4.4 | 20.9 |
| Aromatics | 15.0 | 36.9 | 28.4 |
| Gums (D381), mg/100 ml |  |  |  |
| Unwashed | 6 | 8 | 7 |
| Washed | 2 | 3 | 3 |
| Sulfur (D5453), ppm | 16 | 9 | 49 |
| Density @ 60° F. (D4052-1), g/cc | 0.7192 | 0.7517 | 0.7459 |
| Diene Number (M45), millimoles/g | 0.3 | 0.1 | 0.4 |
| Peroxide Number (M62), ppm | 2.2 | 1.6 | 2.4 |

Aro-1 and Aro-2 were derived by adding the aromatics rich streams to a base fuel stream of alkylate while Aro-3 is a mixture solely of heavy FCC, light FCC, and reformate. In the case of Aro-2 the aromatics rich stream was predominately a reformate stream while for Aro-3 the aromatics stream was predominately a FCC stream.

Aro-1 was predominately alkylate with a minor quantity of a mixture of light FCC and reformate and some heavy FCC. The specifications for the heavy FCC, light FCC and reformate, 98 RON are presented in Table 4.

TABLE 4

|  | Heavy FCC | Light FCC | Reformate |
|---|---|---|---|
| IBP (° F.) | 246 | 99.5 | 95.2 |
| $T_{10}$ | 300 | 140 | 140 |
| $T_{90}$ | 406 | 290 | 320 |
| FBP (° F.) | 453 | 337.8 | 399.4 |

TABLE 4-continued

|  | Heavy FCC | Light FCC | Reformate |
|---|---|---|---|
| RON | 89.8 | 91 | 98.3 |
| MON | 79.7 | 80.7 | 88.2 |
| Aromatics (vol %) | 61.3 | 17.65 | 58.99 |
| Olefins (vol %) | 6.4 | 28.3 | 2.17 |
| Benzene (vol %) | 0.74 | 1.36 | 2.36 |
| Sulfur, ppm | 165 | 140 | 0 |

Figure 2:
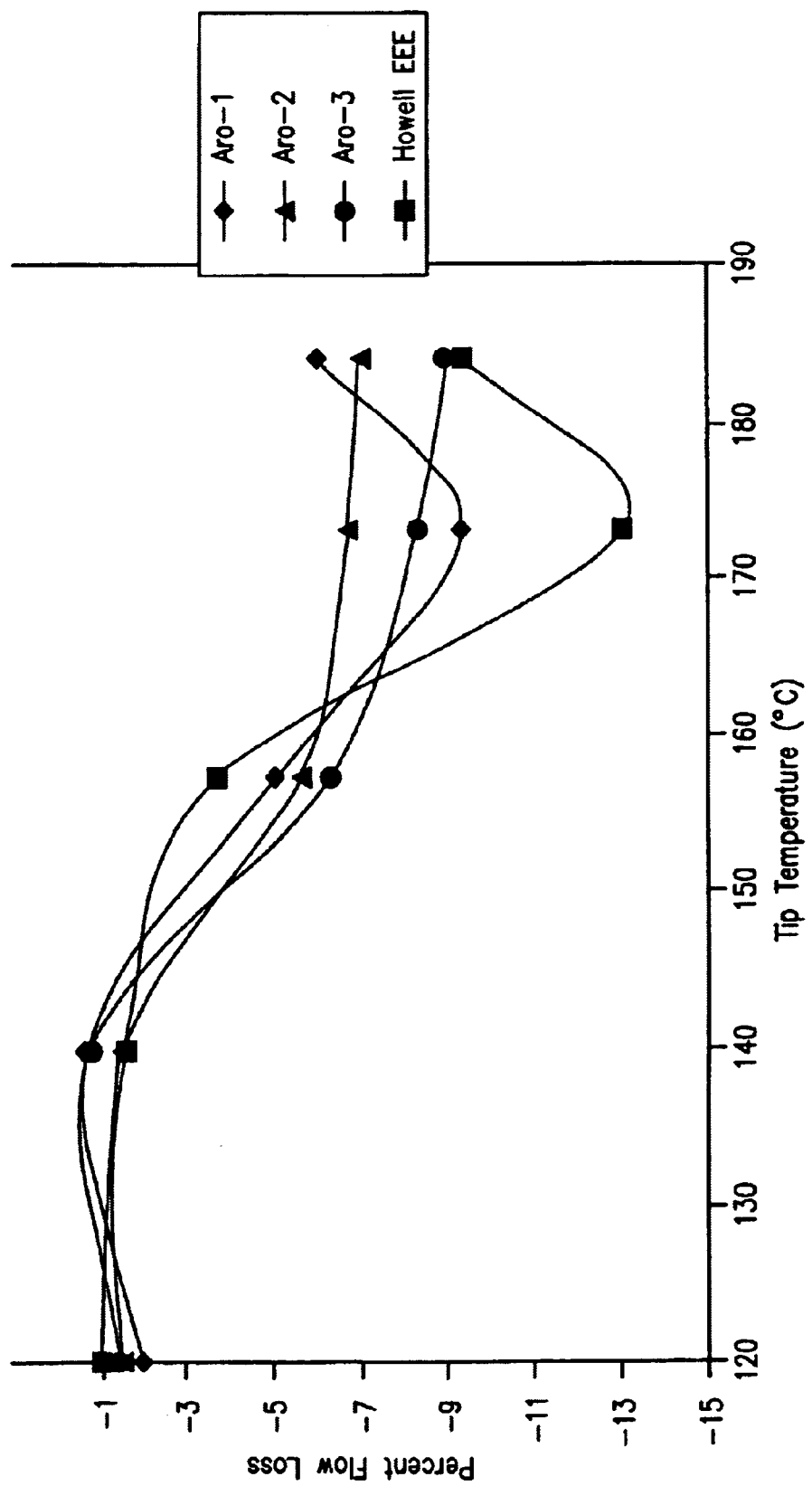
FIG. 2 reports the percent flow loss versus tip temperature for three fuels of controlled aromatics content and Howell EEE reference fuel.

These fuels were similarly tested in the 2.2 liter engine test bed rig previously described, at the same test conditions. The performance of each fuel in terms of injector tip deposit fouling as a function of tip temperature is presented in FIG. 2.

As is seen, Aro-2 causes somewhat lower tip deposit formation as evidenced by a lower percent flow loss as compared against Aro-1 (at temperature of 173° C.) evidencing a minor but observable beneficial effect of increasing aromatics content of the fuel. Aro-3 similarly exhibited a reduction in the percent of flow loss but not as significant as that shown by Aro-2.

The unexpected superiority of Aro-2 versus Aro-1 is believed to be based on the fact that the aromatics content of Aro-2 is greater than that of Aro-1 and attributable exclusively to light FCC and reformate (whereas Aro-1 contained heavy FCC in addition to the light FCC and reformate) and, as compared against Aro-3 the aromatics of Aro-2 are exclusively light FCC and reformate whereas Aro-3 contains a quantity of heavy reformate.

Aro-3 may also be reflecting the negative impact of a higher olefin content as compared with Aro-1 and Aro-2.

In this regard, see Fuel 6 in FIG. 1 which has a $T_{90}$ of 182° C., an olefins content of 5 vol %, a sulfur content of 150 and an aromatics content of 31.9 vol %. As is seen in FIG. 1, this fuel produced the overall lowest percent flow loss as compared with any of the other ten fuels tested indicating that high aromatics content is desirable. The data presented above with respect to Aro-1, Aro-2 and Aro-3 shows that the source of the aromatics also exerts a measurable influence on injector tip deposit formation.

Statistical analysis of the raw data in Table 6 indicates that the improvement in the control/reduction of injector tip deposit formation is attributable to the source of the aromatics.

Regression analysis of that data as presented in Table 5 shows that the regression coefficient for light FCC is positive (beneficial) and for heavy FCC is negative (detrimental). Negative numbers imply lower injector flow, or conversely, greater flow loss, i.e., greater deposit formation.

TABLE 5

SUMMARY

Regression Statistics

| | |
|---|---|
| Multiple R | 0.961144188 |
| R Square | 0.923798149 |
| Adjusted R Square | 0.885697224 |
| Standard Error | 0.417108099 |
| Observations | 7 |

ANOVA

| | df | SS | MS | F | Significance F |
|---|---|---|---|---|---|
| Regression | 2 | 8.43662619 | 4.218313095 | 24.24608174 | 0.005806722 |
| Residual | 4 | 0.695916667 | 0.173979167 | | |
| Total | 6 | 9.132542857 | | | |

| | Coefficients | Standard Error | t Stat | P-value | Lower 95% |
|---|---|---|---|---|---|
| Intercept | −8.416904762 | 0.236165056 | −35.63992453 | 3.69937E−06 | −9.072605433 |
| Heavy FCC | −0.76731746 | 0.110353451 | −6.953271088 | 0.002247828 | −1.073708394 |
| Light FCC | 0.112126984 | 0.017410216 | 6.440298179 | 0.002990604 | 0.063788374 |

| | Coefficients | Standard Error | t Stat | P-value | Lower 95% | Upper 95% |
|---|---|---|---|---|---|---|
| Intercept | −10.53699405 | 0.403370644 | −26.12236219 | 1.27606E−05 | −11.65693282 | −9.417055279 |
| Total FCC | 0.011619048 | 0.005439512 | 2.136045855 | 0.099529048 | −0.003483491 | 0.026721586 |
| Reformate | 0.065958333 | 0.009519146 | 6.929017598 | 0.002277424 | 0.039528891 | 0.092387776 |

As is seen, the coefficient for "total FCC" is 0.0116 which is six times lower than the coefficient for reformate, indicating that of the two, the reformate is preferred as it will produce less injector flow loss. In each case the "P-value" for these coefficients was less than 0.1 indicating well over 90% statistical confidence, as does the adjusted "R squared" for the regression analysis of 88.5%.

Turning attention to heavy FCC versus light FCC, it is seen by reference to the coefficient values that heavy FCC has a coefficient which is negative (−0.767) which is more than seven times lower (detrimental) than the coefficient for light FCC (0.112).

Finally, Table 6 reports the overall fuel compositional profile for Aro-1, Aro-2 and Aro-3 and the result of seven runs in terms of GDI injector flow. Clearly the fuel containing the most reformate and the least heavy FCC/total FCC (Aro-2) resulted in the least negative impact on GDI injector flow rate. Aro-3 while containing the most total FCC also contained the most light FCC and comparing Aro-3 against Aro-1 is seen that the fuel containing more light FCC (Aro-3) is superior in terms of GDI injector flow loss as compared against Aro-1 despite the fact that Aro-3 also contained more heavy FCC than did Aro-1.

What is claimed is:

1. A method for controlling the formation of injector deposits in a gasoline direct injection internal combustion engine by combusting in said engine a fuel comprising gasoline containing from about 12 to about 65 vol % aromatics wherein the source of the aromatics is selected from the group consisting of reformate, a fluid cat cracker stream and mixtures of reformate and a fluid cat cracker stream, wherein with respect to the fluid cat cracker stream a light fluid cat cracker stream fraction in an amount of from about 70% to 100% constitutes the fluid cat cracker stream, and wherein the light fluid cat cracker stream is characterized as having an initial boiling point in the range of about 32° C. to 38° C., a $T_{10}$ in the range of about 54° C. to 66° C., a $T_{90}$ in the range of about 138° C. to 149° C., and a final boiling point in the range of about 166° C. to 177° C.

2. The method of claim 1 wherein the light fluid cat cracker stream constitutes about 85% to 100% of the fluid cat cracker stream.

3. The method of claim 1 wherein the light fluid cat cracker stream constitutes about 95% to 100% of the fluid cat cracker stream.

4. In a method for controlling the formation of injector tip deposits in a gasoline direct injection internal combustion engine by combusting in the engine a fuel comprising

TABLE 6

| | Olefins | Aromatic | Alky | Heavy FCC | Reformate | Light FCC | Total FCC | T90 | Sulfur | End Point | GDI Flow |
|---|---|---|---|---|---|---|---|---|---|---|---|
| Aro-1 | 3.6 | 15 | 70 | 3 | 15 | 12 | 15 | 314 | 16 | 413 | −8.89 |
| | 3.6 | 15 | 70 | 3 | 15 | 12 | 15 | 314 | 16 | 413 | −9.57 |
| | 3.6 | 15 | 70 | 3 | 15 | 12 | 15 | 314 | 16 | 413 | −9.66 |
| Aro-2 | 4.4 | 36.9 | 30 | 0 | 55 | 15 | 15 | 316 | 9 | 406 | −7.12 |
| | 4.4 | 36.9 | 30 | 0 | 55 | 15 | 15 | 316 | 9 | 406 | −6.35 |
| Aro-3 | 20.9 | 28.4 | 0 | 11 | 15 | 74 | 85 | 317 | 49 | 415 | −8.41 |
| | 20.9 | 28.4 | 0 | 11 | 15 | 74 | 85 | 317 | 49 | 415 | −8.71 | gasoline characterized by having a $T_{90}$ in the range of about 150 to 182° C., an olefins content in the range of about 3.6 to 20 vol %, a sulfur content in the range of about 5 to 400 ppm and an aromatics content in the range of about 10–45 vol %, the improvement comprising using as the source of aromatics a stream selected from the group consisting of reformate, a fluid cat cracker stream and mixtures of reformate and a fluid cat cracker stream, wherein with respect to the fluid cat cracker stream a light fluid cat cracker stream fraction in an amount of from about 70 to 100% constitutes the fluid cat cracker stream, wherein the light fluid cat cracker stream is characterized as having an initial boiling point in the range of about 32° C. to 38° C., a $T_{10}$ in the range of about 54° C. to 66° C., a $T_{90}$ in the range of about 138° C. to 149° C., and a final boiling point in the range of about 166° C. to 177° C.

5. The method of claim 4 wherein the light fluid cat cracker stream constitutes about 85 to 100% of the fluid cat cracker stream.

6. The method of claim 4 wherein the light fluid cat cracker stream constitutes about 95 to 100% of the fluid cat cracker stream.

7. The method of claim 1, 2, 3, 4, 5 or 6 wherein the reformat stream is characterized as having a RON of about 95 to 105, an initial boiling point in the range of about 32° C. to 35° C., a $T_{10}$ in the range of about 60° C. to 63° C., a T90 in the range of about 154° C. to 160° C., a final boiling point in the range of about 204° C. to 221° C., and an aromatics content of about 40% to 70%.

8. The method of claim 1, 2, 3, 4, 5, or 6 wherein the aromatics source is a mixture of reformate and fluid cat cracker stream in a ratio of about 100:1 to 75:25.

9. The method of claim 1 or 4 wherein the aromatics source is reformate.

* * * * *